US009750018B2

(12) United States Patent
Chen et al.

(10) Patent No.: US 9,750,018 B2
(45) Date of Patent: Aug. 29, 2017

(54) SYSTEM AND METHOD FOR MULTIPLE CHANNEL BANDWIDTH MODES COEXISTENCE

(71) Applicant: FutureWei Technologies, Inc., Plano, TX (US)

(72) Inventors: Bin Chen, Schaumburg, IL (US); George Calcev, Hoffman Estates, IL (US); Lin Cai, Schaumburg, IL (US); Lukasz Krzymien, Rolling Meadows, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 446 days.

(21) Appl. No.: 13/717,618

(22) Filed: Dec. 17, 2012

(65) Prior Publication Data

US 2013/0155976 A1 Jun. 20, 2013

Related U.S. Application Data

(60) Provisional application No. 61/576,821, filed on Dec. 16, 2011.

(51) Int. Cl.
*H04W 72/04* (2009.01)
*H04W 28/20* (2009.01)
*H04W 84/12* (2009.01)

(52) U.S. Cl.
CPC ..... *H04W 72/0453* (2013.01); *H04W 72/042* (2013.01); *H04W 72/048* (2013.01); *H04W 28/20* (2013.01); *H04W 84/12* (2013.01)

(58) Field of Classification Search
CPC ............ H04L 27/2692; H04W 72/048; H04W 72/0453; H04W 84/12; H04W 74/002; H04W 74/08

USPC ......................................................... 370/329
See application file for complete search history.

(56) References Cited

U.S. PATENT DOCUMENTS

| | | | | |
|---|---|---|---|---|
| 8,625,562 | B2* | 1/2014 | Noh .................... | H04W 72/042 370/338 |
| 8,830,946 | B2* | 9/2014 | Hamiti ................. | H04B 7/2656 370/330 |
| 2005/0041681 | A1* | 2/2005 | Lee et al. ....................... | 370/437 |
| 2008/0056135 | A1* | 3/2008 | Lee et al. ....................... | 370/236 |
| 2008/0267134 | A1* | 10/2008 | Cheng .................. | H04W 56/00 370/335 |
| 2009/0016375 | A1* | 1/2009 | Hsieh ................... | H04L 5/0007 370/465 |
| 2009/0175372 | A1* | 7/2009 | Moon et al. .................. | 375/260 |

(Continued)

OTHER PUBLICATIONS

Merlin s et al.,"US Channelization, 2011103r0 Qualcomm US Channelization, "extended submission"", Oct. 31, 2011, 9 pages.*

(Continued)

*Primary Examiner* — Ian N Moore
*Assistant Examiner* — Mewale Ambaye
(74) *Attorney, Agent, or Firm* — Slater Matsil, LLP

(57) ABSTRACT

A method for transmitting a transmission to a station in a wireless network includes transmitting a preamble of the transmission to the station using a first channel with a first bandwidth, the preamble including a first indicator indicating a second channel with a second bandwidth, the second bandwidth greater than the first bandwidth, and transmitting a data portion of the transmission to the station using the second channel with the second bandwidth.

23 Claims, 14 Drawing Sheets

(56) References Cited

U.S. PATENT DOCUMENTS

2011/0261835 A1* 10/2011 Dhesikan ............ H04L 12/5695
                                                    370/468
2012/0327870 A1* 12/2012 Grandhi et al. .............. 370/329
2013/0148625 A1*  6/2013 Kim ...................... H04L 1/0025
                                                    370/329

OTHER PUBLICATIONS

Merlin, S., et al., "US Channelization," Oct. 31, 2011 Qualcomm US Channelization, Extend Submission, Oct. 31, 2011,9 pages.*
Banerjea, R., et al., "US Channelization," Extend Submissions, Oct. 3, 2011, 5 pages.
Merlin, S., et al., "US Channelization," 20111031r0 Qualcomm US Channelization, Extend Submission, Oct. 31, 2011, 9 pages.
Vermani, S., et al., "Preamble Format for 1 MHz," IEEE 802.11-11/11/1482r2, Submission, Nov. 7, 2011, 30 pages.
Park, M., "Proposed Specification Framework for TGah," IEEE P802.11 Wireless LANs, IEEE 802.11-11/1137r12, Nov. 15, 2012, 51 pages.

* cited by examiner

SYSTEM AND METHOD FOR MULTIPLE CHANNEL BANDWIDTH MODES COEXISTENCE

This application claims the benefit of U.S. Provisional Application No. 61/576,821, filed on Dec. 16, 2011, entitled "Systems and Methods for the Coexistence between Different Channel Bandwidth Modes in Wireless Networks," which application is hereby incorporated herein by reference.

TECHNICAL FIELD

The present disclosure relates generally to digital communications, and more particularly to a system and method for multiple channel bandwidth modes coexistence.

BACKGROUND

In an IEEE 802.11 compliant communications system (also known as WiFi), an access point (AP) serves one or more stations (STA) by receiving transmissions from the one or more STA and forwarding the transmissions to their intended destinations. Similarly, the AP receives a transmission intended for one of its STA and forwards the transmission to the STA. A transmission occurs over unidirectional channels referred to as communications links. A transmission from a STA to the AP may be referred as an uplink (UL) transmission, while a transmission from the AP to a STA may be referred to as a downlink (DL) transmission.

In IEEE 802.11, the communication channel is shared by stations under a mechanism called distributed channel access with a function called distributed coordination function (DCF), which uses a carrier sense multiple access with collision avoidance (CSMA/CA) mechanism. The DCF uses both physical and virtual carrier sense functions to determine the state of the communication channel. The physical carrier sense resides in the physical layer (PHY) and uses the energy detection or the preamble detection with frame length deferral when it determines that the communication channel is busy. In this disclosure the term preamble or the PHY preamble is used to identify that portion of the transmission at lower rate and usually generated at the PHY layer. The data part of the transmission it usually comes from the higher layers such as medium access control (MAC), Internet Protocol (IP), and/or session layers. The virtual carrier sense resides in the MAC and it uses reservation information carried in the Duration field of the MAC packet headers announcing the duration of packet transmission and packet acknowledgment over the communication channel. The virtual carrier sense mechanism is called the network allocation vector (NAV). The communication channel is determined to be idle only when both the physical and virtual carrier sense mechanisms indicate it to be so.

A STA with a data frame for transmission first performs a clear channel assessment (CCA) by sensing the communication channel for a fixed duration, commonly referred to as the DCF inter-frame space (DIFS). If the communication channel is busy, the station waits until the communication channel becomes idle, defers for a DIFS, and then waits for a further random backoff period. The backoff timer decreases by one for every idle slot and freezes when the communication channel is sensed busy. When the backoff timer reaches zero, the station starts data transmission. The communication channel access procedure is shown in FIG. 1.

IEEE 802.11 has recently launched the task group TGah, which is designed to support sensor/smart meters applications, as well as backhaul and cellular offloading for under 1 GHz. TGah will follow the IEEE 802.11 basic protocol with the support of 1 MHz, 2 MHz, 4 MHz, 8 MHz and 16 MHz channels, where only 1 MHz and 2 MHz channels are mandatory. In the actual specification framework document, the support for 1 MHz and 2 MHz channels is mandatory for all TG11ah compliant devices. Therefore the issues related to the coexistence between 1 MHz and 2 MHz (as well as other channel bandwidths) should be addressed.

SUMMARY OF THE DISCLOSURE

Example embodiments of the present disclosure which provide a system and method for multiple channel bandwidth modes coexistence.

In accordance with an example embodiment of the present disclosure, a method for transmitting a transmission to a station in a wireless network is provided. The method includes transmitting, by a transmitter, a preamble of the transmission to the station using a first channel with a first bandwidth, the preamble including a first indicator indicating a second channel with a second bandwidth, the second bandwidth greater than the first bandwidth. The method also includes transmitting, by the transmitter, a data portion of the transmission to the station using the second channel with the second bandwidth.

In accordance with another example embodiment of the present disclosure, a method for receiving a transmission from a transmitter in a wireless network is provided. The method includes receiving, by a station, a preamble of the transmission from the transmitter using a first channel with a first bandwidth, the preamble including a first indicator indicating a second channel with a second bandwidth, the second bandwidth greater than the first bandwidth. The method also includes receiving, by the station, a data portion from the transmitter using the second channel with the second bandwidth.

In accordance with an example embodiment of the present disclosure, a device is provided. The device includes a transmitter. The transmitter transmits a preamble of a transmission to a station using a first channel with a first bandwidth, the preamble including a first indicator indicating a second channel with a second bandwidth, the second bandwidth greater than the first bandwidth, and transmits a data portion of the transmission to the station using the second channel with the second bandwidth.

In accordance with an example embodiment of the present disclosure, a device is provided. The device includes a receiver. The receiver receives a preamble of a transmission from a transmitter using a first channel with a first bandwidth, the preamble including a first indicator indicating a second channel with a second bandwidth, the second bandwidth greater than the first bandwidth, and receives a data portion from the transmitter using the second channel with the second bandwidth.

One advantage of an embodiment is that the use of higher bandwidth channels allow for higher throughput transmissions, which typically will result in shorter transmitting and/or receiving times. Hence, for stations that are battery limited, the shorter transmitting and/or receiving times can extend the useful life between batter changes or recharges.

A further advantage of an embodiment is that the smaller bandwidth channels usually transmit at higher power levels with less complex modulation and coding schemes, which may allow for greater coverage areas. Therefore, the transmission of preambles on the smaller bandwidth channels and the transmission of data on the larger bandwidth channels can help to ensure that a wider area of stations may be able to detect the preambles and will be able to maintain their NAV properly.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to multiple channel bandwidth modes coexistence. For example, at a transmitter, the transmitter transmits a preamble of a transmission to the station using a first channel with a first bandwidth, the preamble including a first indicator indicating a second channel with a second bandwidth, the second bandwidth greater than the first bandwidth. The transmitter also transmits a data portion of the transmission to the station using the second channel with the second bandwidth. As another example, at a receiver, the receiver receives a preamble of the transmission from the transmitter using a first channel with a first bandwidth, the preamble including a first indicator indicating a second channel with a second bandwidth, the second bandwidth greater than the first bandwidth. The receiver receives a data portion from the transmitter using the second channel with the second bandwidth. In a different embodiment the transmitter copies the preamble (i.e., duplicates the preamble) over multiple frequency channels such that the total bandwidth of the preamble copies match the frequency bandwidth of the data transmission. This approach will potentially reduce the coverage of the preamble because the same power is spread over a larger bandwidth but will give the possibility that stations that operate in the larger bandwidth used for data transmission decode the preamble and refrain from transmission during data transmission.

The present disclosure will be described with respect to example embodiments in a specific context, namely an IEEE 802.11 compliant communications system with support for multiple channel bandwidths. The disclosure may also be applied, however, to other standards compliant and non-standards compliant communications systems that support multiple channel bandwidths.

Figure 1:
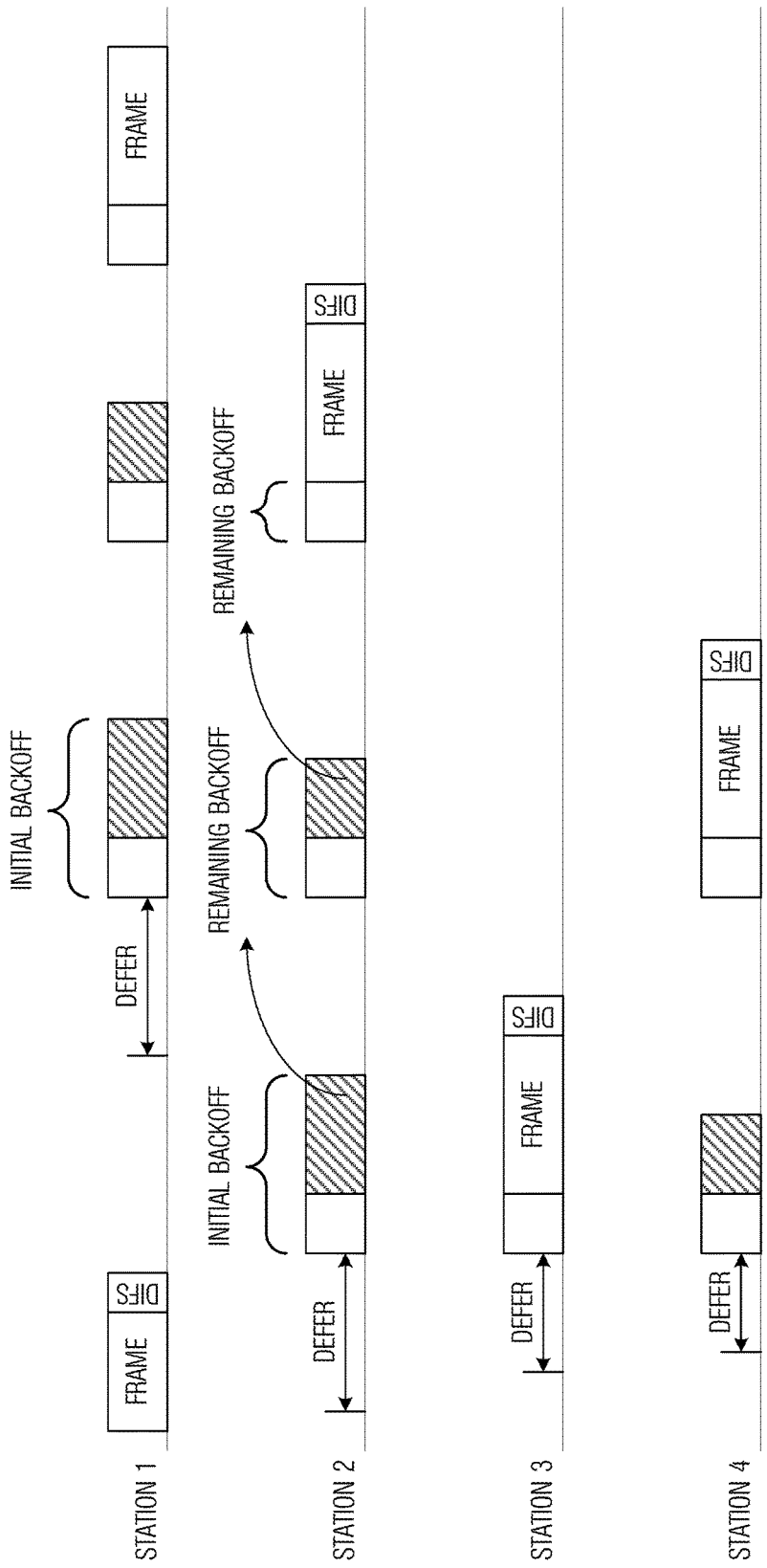
FIG. 1 illustrates prior art communications channel access procedure.
Figure 2:
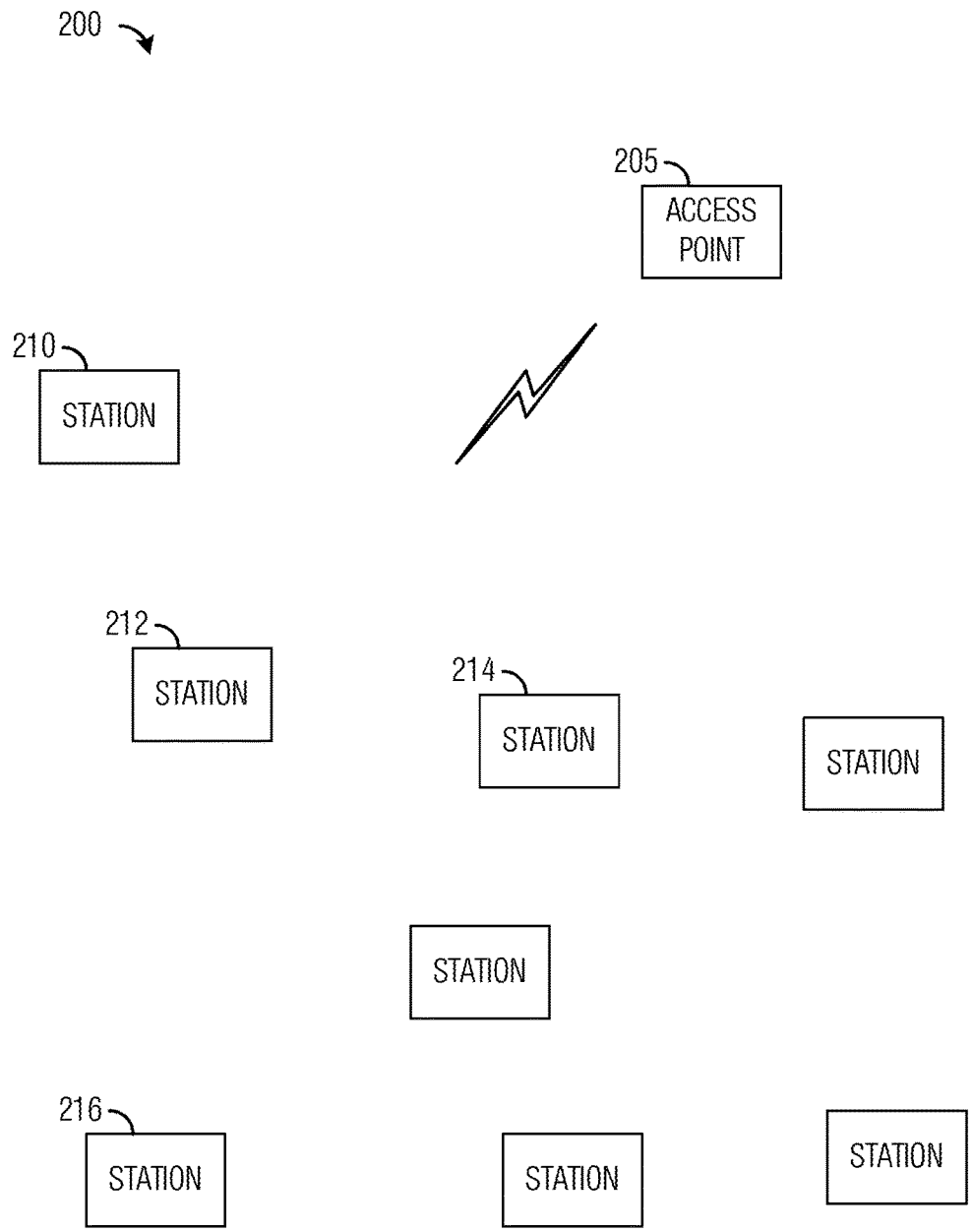
FIG. 2 illustrates an example communications system according to example embodiments described herein.

FIG. 2 illustrates a communications system 200. Communications system 200 includes an AP 205 that serves a plurality of stations, such as station 210, station 212, station 214, and station 216. Communications within communications system 200 may take place between AP 205 and a station, such as station 210, station 212, station 214, and station 216. Communications may also take place between a pair of stations. While it is understood that communications systems may employ multiple APs capable of communicating with a number of stations, only a limited number of APs and stations are illustrated for simplicity.

In the current draft of the IEEE 802.11ah specification framework document, 1 MHz and 2 MHz modes of operation are mandatory for IEEE 802.11ah compliant devices. The 1 MHz mode of operation was provided for two reasons. The first reason is that, in some countries such as Japan, the spectrum regulation does not allow channels larger than 1 MHz in the unlicensed bands below 1 GHz. The second reason is that one of the design requirements for this standard asks for 1 km range and a low rate of 150 kbps. This requirement is satisfied for 1 MHz transmissions with 2 times repetition. However, the 1 MHz operation mode is less efficient than 2 MHz operation because it achieves a lower throughput with adverse impacts on the battery life in sensor networks. In addition, a larger bandwidth is more suitable for applications such as cellular offloading, which requires higher throughput.

Figure 3:
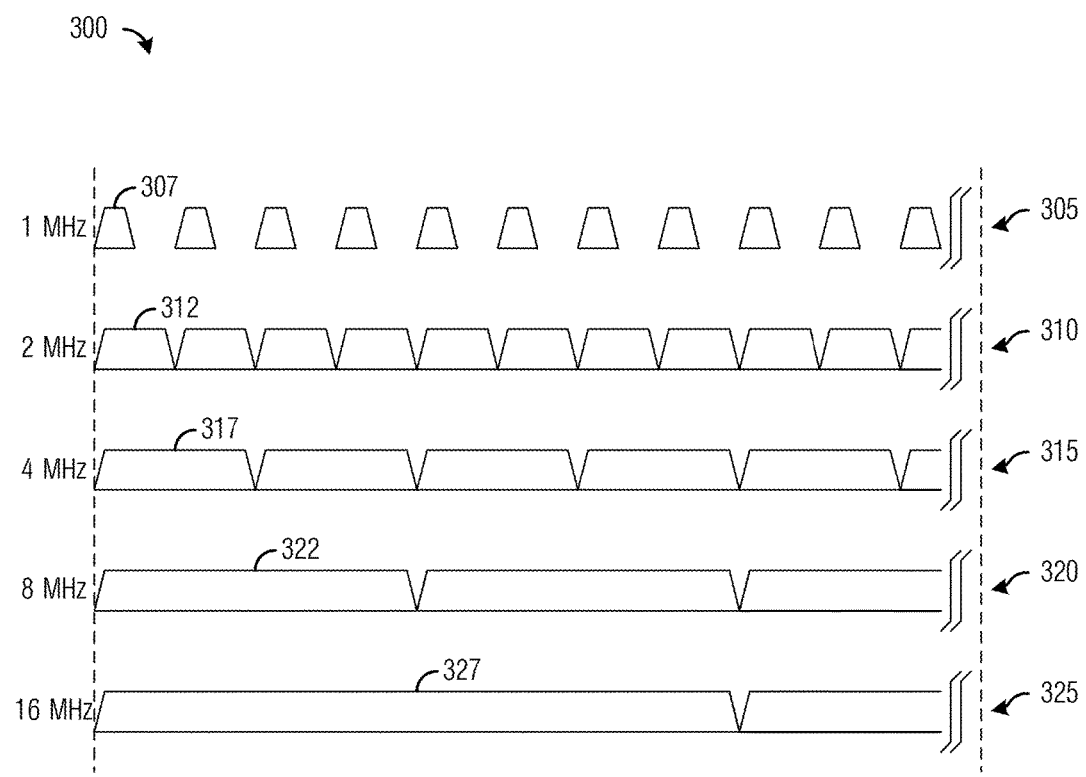
FIG. 3 illustrates an example channelization according to example embodiments described herein.

FIG. 3 illustrates an example channelization 300. A first row of channels 305 indicates 1 MHz channels (e.g., channel 307), a second row of channels 310 indicates 2 MHz channels (e.g., channel 312), a third row of channels 315 indicates 4 MHz channels (e.g., channel 317), a fourth row of channels 320 indicates 8 MHz channels (e.g., channel 322), and a fifth row of channels 325 indicates 16 MHz channels (e.g., channel 327). It is noted that the 1 MHz channels are implemented in 2 MHz channels.

In an IEEE 802.11 operating mode referred to as infrastructure mode, an AP coordinates the behavior of associated stations. Before joining a basic service set (BSS), each station needs to discover an AP and then associate with it. The stations that are far away from the AP (or those stations under bad channel conditions) may just be able to decode frames transmitted by the AP on 1 MHz channel (since frames on 1 MHz channel can be transmitted with higher spectrum power density and lower modulation and coding scheme (MCS), or there will be special frame format with special preamble format which are different from that on 2 MHz channel), while the close-in stations (or those under good channel conditions, i.e., with high signal to noise reception) can decode frames transmitted by the AP on both 1 MHz and 2 MHz channels.

This situation may raise an issue when the AP sends a frame on 2 MHz channel (or higher bandwidth channel), and the far away stations cannot decode the preamble and cannot set the NAV correctly. These stations may then consume additional power for further channel CCA. This situation is also a problem when one station transmits a frame on 2 MHz channel (or higher bandwidth channel) and some far away stations can't decode the preamble, leading to the NAV being set incorrectly, leading to higher power consumption for further channel CCA. In other words, this problem generally is caused by the different coverage areas of the 1 MGHz and 2 MGz transmissions.

According to an example embodiment, it may be possible to transmit a preamble on a 1 MHz channel, thereby allowing all stations (including legacy stations not compatible with IEEE 802.11ah, as well as IEEE 802.11ah compatible stations) to decode the preamble, while a data portion may be transmitted on a higher bandwidth channel, such as 2 MHz, 4 MHz, 8 MHz, 16 MHz, and the like. The transmission of the preamble on the 1 MHz channel may also help to maximize the decoding and detection of the preamble by far-away stations and helping to reduce power consumption at the far-away stations. The transmission of the data portion on the higher bandwidth channels may help to improve overall throughput of the communications system.

Figure 4A:
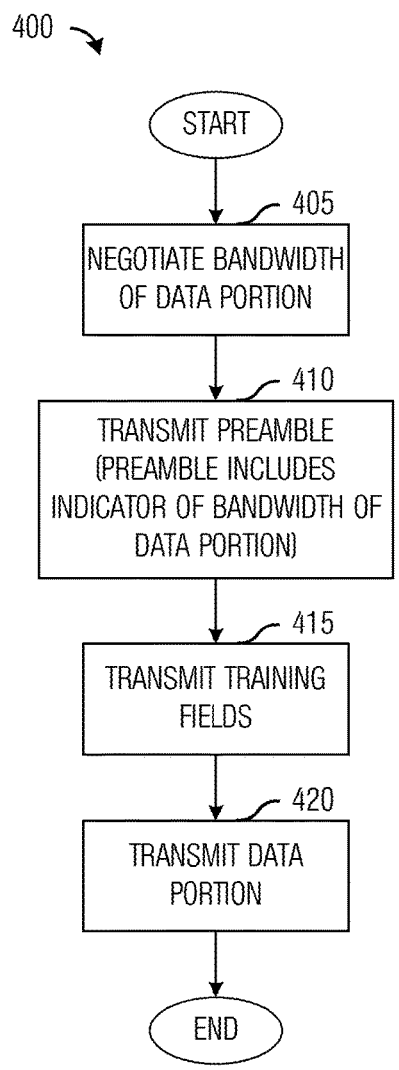
FIG. 4a illustrates an example flow diagram of operations in a station as the station transmits according to example embodiments described herein.

FIG. 4a illustrates a flow diagram of operations 400 in a station as the station transmits. Operations 400 may be indicative of operations occurring at a first AP or a first station as the first AP or the first station transmits to a second station or a second AP. For simplicity, the discussion will refer generically to the first AP or the first station as a first device and to the second AP or the second station as a second device.

Operations 400 may begin with the first device negotiating with the second device for the bandwidth of a channel to be used to transmit the data portion (block 405). Generally, the bandwidth of the channel may be dependent on factors such as channel availability, first device capability, second device capability, channel condition, and the like. As an example, even if the first device and second device are capable of using 8 MHz channels, it may not be possible to use an 8 MHz channel if there are none available or if channel conditions prevent its use. As an illustrative example, the negotiation for the bandwidth of the channel may include an exchange of several messages, such as clear to send (CTS) and request to send (RTS) messages, between the first device and the second device. A detailed discussion of example embodiments of the negotiation process is provided below.

The first station may transmit a PHY preamble to the second station (block 410). According to an example embodiment, the preamble may include an indicator that indicates the bandwidth of the channel used to transmit the data portion. As an example, the indicator may be a one or more bit indicator. If there only two possible channel bandwidths (e.g., 1 MHz or 2 MHz), then a single bit indicator may be used to indicate the bandwidth. If there are more than two possible channel bandwidths, then a multi-bit indicator may be used. The preamble may also indicate if the preamble is being transmitted by an access point (e.g., a bit indicating access point transmission) or if the device is the intended receiver of the preamble (e.g., an association identifier (AID) or a partial AID). Additionally, some other differentiation technique may be used as an indicator. As an example, a modulation scheme or modulation phase rotation status may be used to indicate the bandwidth of the channel. As another example, a known sequence or cross correlation sequence may be used as an indicator.

The first station may transmit the PHY preamble on a 1 MHz channel (or another agreed upon channel bandwidth that is smaller than the bandwidth of the channel used to transmit the data portion) to help maximize compatibility and coverage range. Detailed discussion of example embodiments of the PHY preamble is provided below.

The first station may transmit one or more training fields (block 415). In general, a training field may be used to assist the second station in detecting and decoding the data portion, which may be used for carrier synchronization, and channel estimation, frequency offset compensation, and the like. The training fields may contain known sequences that are used by the second station to make adjustments to its receiver and/or receiving circuitry to help it improve its detecting and decoding performance. Detailed discussion of example embodiments of the training fields is provided below. The first station may transmit the data portion on a channel having the indicated bandwidth (block 420).

Figure 4B:
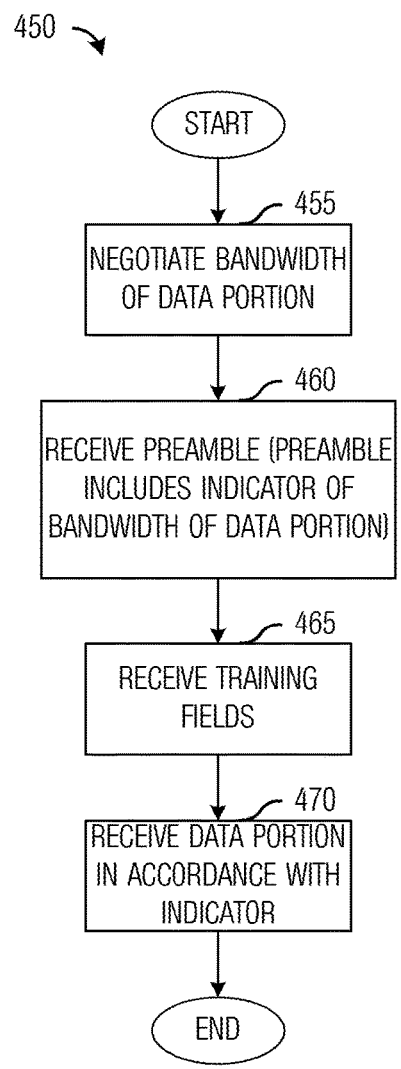
FIG. 4b illustrates an example flow diagram of operations in a station as the station receives according to example embodiments described herein.

FIG. 4b illustrates a flow diagram of operations 450 in a station as the station receives. Operations 450 may be indicative of operations occurring at a first AP or a first station as the first AP or the first station receives from a second station or a second AP. For simplicity, the discussion will refer generically to the first AP or the first station as a first device and to the second AP or the second station as a second device.

Operations 450 may begin with the second device negotiating with the first device for the bandwidth of the channel to be used to receive the data portion (block 455). The second device may receive a preamble on a 1 MHz channel (or another agreed upon channel bandwidth that is smaller than the bandwidth of the channel used to receive the data portion) (block 460). In an alternative example embodiment, multiple copies of the preamble are transmitted over multiple channels to match the data bandwidth transmission. As an example, bandwidth of the preambles may be lower than data bandwidth but higher than a single preamble bandwidth. The preamble bandwidth and the number of copies are either reestablished by design or signaled in the copies of the preamble, for example. The preamble may include an indicator of channel bandwidth of a second channel used to receive the data portion. The preamble may also indicate if the preamble is being transmitted by an access point (e.g., a bit indicating access point transmission) or if the device is the intended receiver of the preamble (e.g., an association identifier (AID) or a partial AID). The second device may receive one or more training fields that it may use to make adjustments to its receiver and/or receiving circuitry to help improve its detecting and decoding performance (block 465). The second device may receive the data portion on a channel having the indicated bandwidth (block 470).

In general, the second device receives and decodes the preamble. Based on information in the preamble, the second device may be able to determine if it needs to receive the data portion. If it does not need to receive the data portion, the second device may set its NAV based on information in the preamble. Due to signaling differences in the 1 MHz bandwidth channel, the preamble may transmitted over a larger coverage area so that far-away stations may be able to receive and decode the preamble and therefore set its NAV correctly.

As an illustrative embodiment, the second device may be initially set to operate using 1 MHz bandwidth channels (for both preamble transmission and data portion transmission). An access point serving the second device may determine the initial operating mode of the second device by considering factors such as channel condition, the second station's capability, channel availability, and the like. The use of 1 MHz bandwidth channels may be referred to as 1 MHz mode operation. The access point may broadcast information to the stations in the BSS that they are to operate in the 1 MH mode. Alternatively, the access point may broadcast information to the station in the BSS that they are to transmit preambles on 1 MHz bandwidth channels. A device operating in 1 MHz mode may change to a 2 MHz (or higher, e.g., 4 MHz, 8 MHz, 16 MHz, and the like) when channel conditions change or a different situation arises (such as channel availability).

When a device operating only in 1 MHz mode detects a preamble on a 1 MHz bandwidth channel which indicates a larger bandwidth data transmission, it will not continue to receive a higher bandwidth data portion (or a training field (to be discussed later)). Instead, the device may set its NAV in accordance with information contained in the preamble. However, a device operating in 2 MHz (or higher) mode detects a preamble on a 1 MHz bandwidth channel, it will continue to receive the data portion on the 2 MHz (or higher) bandwidth channel. A decision to continue receiving and decoding the data portion (and the training field if present) on the 2 MHz (or higher) bandwidth channel may be based on the indicator located in the preamble. The preamble may also indicate if the preamble is being transmitted by an access point (e.g., a bit indicating access point transmission) or if the device is the intended receiver of the preamble (e.g., an association identifier (AID) or a partial AID).

Figure 5A:
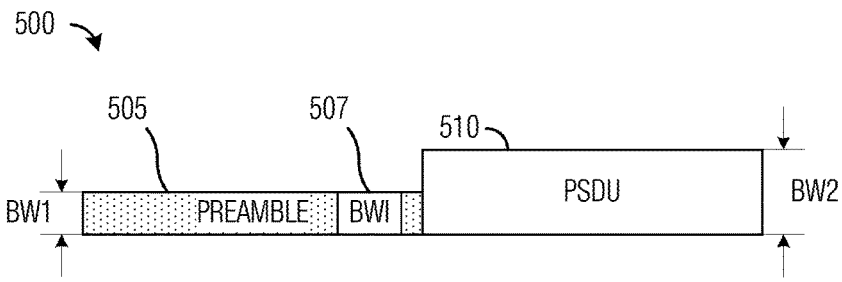
FIGS. 5a through 5c illustrate example transmissions having an indicator in a preamble according to example embodiments described herein.

FIG. 5a illustrates a first transmission 500 having an indicator in a preamble. First transmission 500 includes a preamble 505. Preamble 505 may be transmitted on a first channel with a first bandwidth (BW1), for example, a 1 MHz bandwidth channel. Preamble 505 may include an indicator, such as a bandwidth indicator (BWI), 507. BWI 507 may indicate a second bandwidth (BW2) of a second channel used to transmit a data portion 510 of first transmission 500, commonly referred to as a physical layer service data unit (PSDU). As shown in FIG. 5a, the second bandwidth of the second channel is larger than the first bandwidth of the first channel. As an example, first channel may be a 1 MHz bandwidth channel and second channel may be a 2 MHz bandwidth channel.

As an alternative, BWI 507 may indicate the second channel, which depending on location (for example, frequency band) and/or time (for example, time slot, frame number, and the like), may have an inherent bandwidth. Consider the channelization shown in FIG. 3, if BWI 507 indicates a channel in frequency band associated with third row of channels 315, then the bandwidth of such channel is inherently known as 4 MHz.

It is noted that although shown in FIG. 5a as being continuous in time with preamble 505 immediately preceding data portion 510, there is no requirement that preamble 505 immediately precede data portion 510. Additionally, although shown in FIG. 5a as sharing some frequency, i.e., the first channel occupies a portion of the bandwidth of the second channel, preamble 505 and data portion 510 may or may not have any frequency in common. As an example, preamble 505 may be transmitted on a 1 MHz channel in a first frequency range and data portion 510 may be transmitted on a 4 MHz channel in a second frequency range with first frequency range and second frequency range having no common frequencies.

Figure 5B:
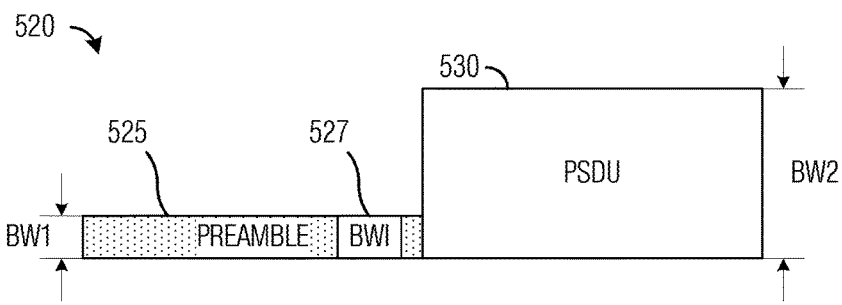

FIG. 5b illustrates a second transmission 520 having an indicator in a preamble. Second transmission 520 includes a preamble 525. Preamble 525 may be transmitted on a first channel with a first bandwidth (BW1), for example, a 1 MHz bandwidth channel. Preamble 525 may include an indicator, such as a BWI 527. BWI 527 may indicate a second bandwidth (BW2) of a second channel used to transmit a data portion 530 of second transmission 520. As shown in FIG. 5b, the second bandwidth of the second channel is larger than the first bandwidth of the first channel. As an example, first channel may be a 1 MHz bandwidth channel and second channel may be a 4 MHz bandwidth channel.

Figure 5C:
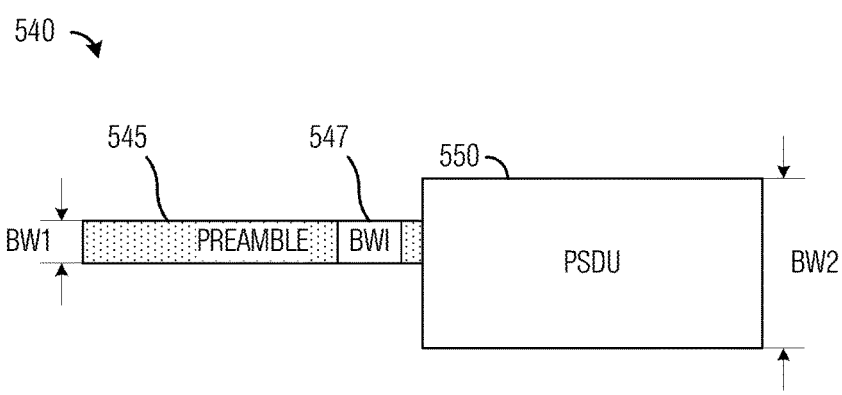

FIG. 5c illustrates a third transmission 540 having an indicator in a preamble. Third transmission 540 includes a preamble 545. Preamble 545 may be transmitted on a first channel with a first bandwidth (BW1), for example, a 1 MHz bandwidth channel. Preamble 545 may include an indicator, such as a BWI 547. BWI 547 may indicate a second bandwidth (BW2) of a second channel used to transmit a data portion 550 of third transmission 540. As shown in FIG. 5c, the second bandwidth of the second channel is larger than the first bandwidth of the first channel. As an example, first channel may be a 1 MHz bandwidth channel and second channel may be a 4 MHz bandwidth channel. It is noted that second transmission 520 differs from third transmission 540 in the location of preamble 525 versus preamble 545 relative to the bandwidth of the second channel.

Figure 6A:
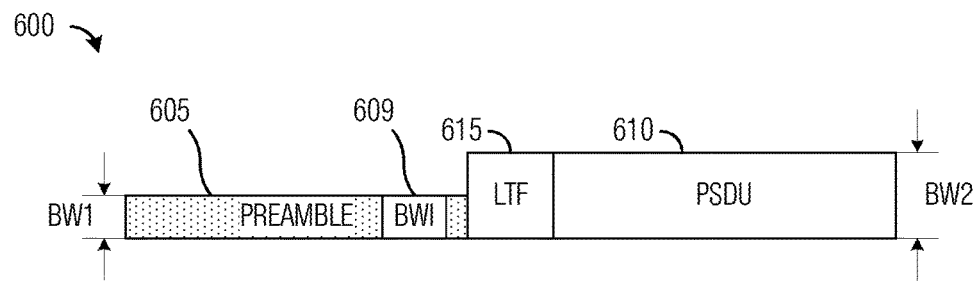
FIGS. 6a and 6b illustrate example transmissions having an indicator in a preamble and a training field according to example embodiments described herein.

FIG. 6a illustrates a fourth transmission 600 having an indicator in a preamble and a training field. Fourth transmission 600 includes a preamble 605. Preamble 605 may be transmitted on a first channel with a first bandwidth (BW1), for example, a 1 MHz bandwidth channel. Preamble 605 may include an indicator, such as BWI 607. BWI 607 may indicate a second bandwidth (BW2) of a second channel used to transmit a data portion 610 of fourth transmission 600. As shown in FIG. 6a, the second bandwidth of the second channel is larger than the first bandwidth of the first channel. As an example, first channel may be a 1 MHz bandwidth channel and second channel may be a 2 MHz bandwidth channel.

In order to assist a device in detecting and decoding fourth transmission 600, a training field 615, such as a long training field (LTF), may be transmitted. Training field 615 is transmitted on the second channel along with data portion 610. The use of the second channel (the same used for data portion 610) allows the device to obtain a better estimate of the second channel and therefore improve its detecting and decoding performance.

Figure 6B:
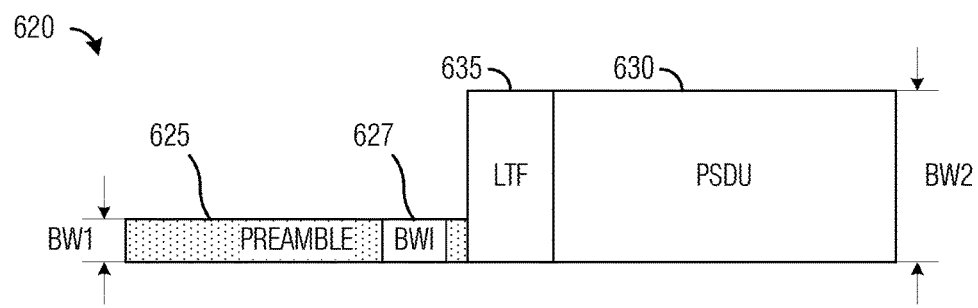

FIG. 6b illustrates a fifth transmission 620 having an indicator in a preamble and a training field. Fifth transmission 620 includes a preamble 625. Preamble 625 may be transmitted on a first channel with a first bandwidth (BW1), for example, a 1 MHz bandwidth channel. Preamble 625 may include an indicator, such as BWI 627. BWI 627 may indicate a second bandwidth (BW2) of a second channel used to transmit a data portion 630 of fifth transmission 620. As shown in FIG. 6b, the second bandwidth of the second channel is larger than the first bandwidth of the first channel. As an example, first channel may be a 1 MHz bandwidth channel and second channel may be a 4 MHz bandwidth channel. Again, a training field 625 is transmitted on the second channel to help assist the device obtain an estimate of the second channel and improve its detecting and decoding performance.

Figure 7:
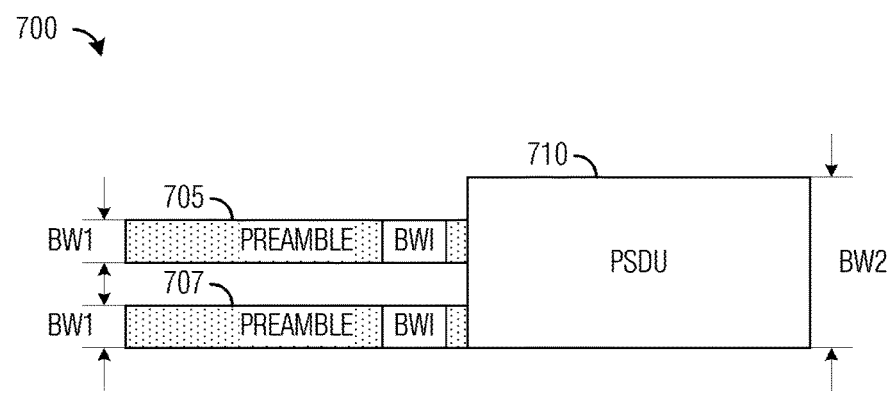
FIG. 7 illustrates an example transmission having multiple preambles according to example embodiments described herein.

FIG. 7 illustrates a transmission 700 having multiple preambles. Transmission 700 includes a first preamble 705 and a second preamble 707. First preamble 705 and second preamble 707 may be identical with exception that they are transmitted in different frequency ranges. First preamble 705 and second preamble 707 may have an indicator, such as a BWI, that indicates the second bandwidth of the second channel used to transmit a data portion 710. First preamble 705 and second preamble 707 may be different in that one preamble may include an indicator of the second bandwidth of the second channel used to transmit data portion 710. First preamble 705 and second preamble 707 may be different in that one preamble may include a first version of the indicator, e.g., implemented as a one or multi-bit indicator, while one preamble may include a second version of the indicator, e.g., a different modulation technique to indicate the second bandwidth. According to an example embodiment, there may be a preamble for every 2 MHz of bandwidth of the second channel. Hence, if the second channel is an 8 MHz channel, then there may be 4 preambles. According to an alternative example embodiment, there are two 1 MHz preambles for a 2 MHz channel, so for 8 MHz data transmission there are 8 copies of the same 1 MHz preamble.

Figure 8A:
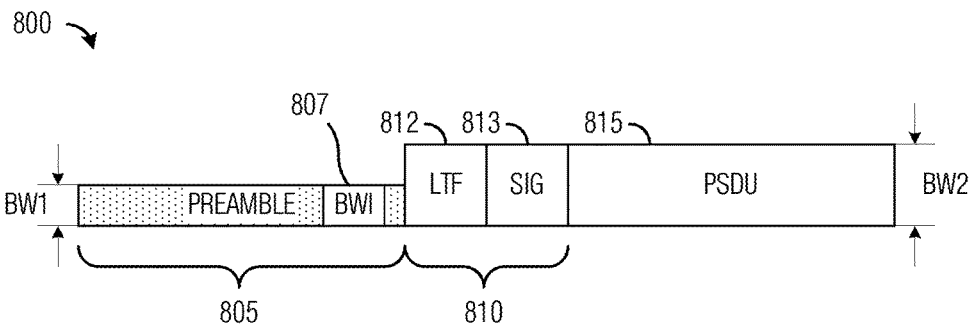
FIGS. 8a and 8b illustrate example views of a transmission with a preamble in a second channel according to example embodiments described herein.

FIG. 8a illustrates a high level view of a transmission 800 with a preamble in a second channel. Transmission 800 includes a first preamble 805. First preamble 805 may be transmitted on a first channel with a first bandwidth (BW1), for example, a 1 MHz bandwidth channel. First preamble 805 may include an indicator, such as BWI 807, that indicates a second bandwidth (BW2) of a second channel and/or a format of a second preamble. The second bandwidth is generally greater than the first bandwidth. The second channel may be used to transmit a second preamble 810 and a data portion 815. Both second preamble 810 and data portion 815 may occupy the second bandwidth. Second preamble 810 may include a training field 812, e.g., a LTF and/or a short training field (STF), and/or a signal (SIG) field 813.

Figure 8B:
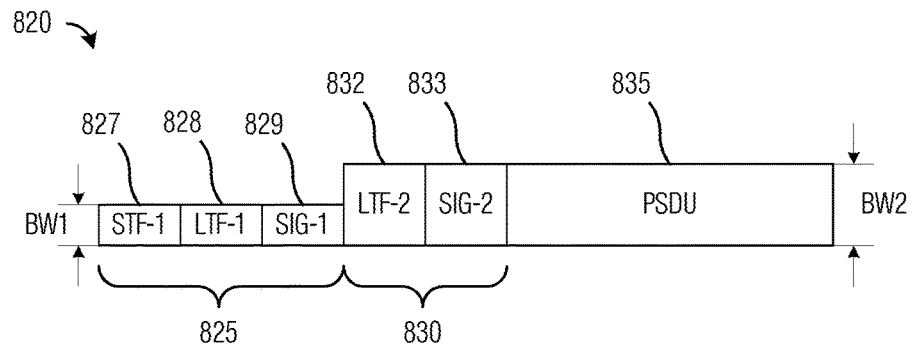

FIG. 8b illustrates a detailed view of a transmission 820 with a preamble in a second channel. Transmission 820 may include a first preamble 825, a second preamble 830, and a data portion 835. First preamble 825 is transmitted on a first channel with a first bandwidth and second preamble 830 and data portion 835 is transmitted on a second channel with a second bandwidth. The second bandwidth is generally greater than the first bandwidth. As an illustrative example, the first bandwidth may be 1 MHz while the second bandwidth may be 2 MHz, 4 MHz, 8 MHz, 16 MHz, and the like.

First bandwidth 825 may include a first STF (STF-1) 827, a first LTF (LTF-1) 828, and a first SIG field (SIG-1) 829. First SIG field 829 may include an indicator that indicates preamble format of second preamble 830 and/or the second bandwidth. The indicator in first SIG field 829 may be a one or more bit long indicator that indicates the bandwidth of data portion 835 (i.e., the second bandwidth). Second preamble 830 may include a second LTF (LTF-2) 832 and a second SIG field (SIG-2) 833. As an illustrative example, to enable detection and decoding by a larger number of stations, first SIG field 829 may be encoded with a lower rate MCS than second SIG field 833 (for example, first SIG field 829 is encoded with binary phase shift keying (BPSK) 1/2 with repetition 2 and second SIG field 833 is encoded with BPSK 1/2. Furthermore, first SIG field 829 may be 2 or 4 symbols in length and second SIG field 833 is 2 or 1 symbols in length. Similarly, second LTF 832 may be 1 or 2 symbols long, and first SIG field 829 may be shorter than a typical SIG field used in IEEE 802.11 compliant devices not supporting 1 MHz mode or 2 MHz mode. As an illustrative example, a typical SIG field is 6 or 8 symbols long and first SIG field 829 may be 4 or 2 symbols.

Alternatively, the indicator may be in the form of a particular sequence, used in first STF 827 or first LTF 828. As an example, a particular phase rotation in symbols of first LTF 828 or a specified sequence for first LTF 828 may be used to represent different possible values of the indicator. As another example, a particular phase rotation in a first, second, third, and the like, symbol of first SIG field 829 may be used to represent different possible values of the indicator. As an illustrative example, a 0 degree phase rotation in a symbol of first SIG field 829 may indicate that second preamble 835 is a 1 MHz preamble (i.e., the second bandwidth is 1 MHz) and a 90 degree phase rotation in the symbol may indicate that second preamble 835 is a 2 MHz preamble (and potentially a format of second preamble 835).

Generally, when a station decodes a 1 MHz preamble and determines that there is a 2 MHz (or greater) preamble in a second channel, the station may attempt to decode the 2 MHz preamble. If the station is not able to decode the 2 MHz preamble, the station may set its NAV in accordance with information from the 1 MHz preamble, e.g., information from a first SIG field in the 1 MHz preamble. If the station is able to decode the 2 MHz preamble, the station may make use of information contained in both the 1 MHz preamble and the 2 MHz preamble (e.g., information from SIG fields in the two preambles). If the station is able to determine if it is or is not the intended receiver of the transmission (e.g., by decoding the AID or partial AID) after decoding the 1 MHz preamble, the station may be able to avoid decoding the rest of the transmission. However, if the AID or partial AID is split between the two preambles, the station may or may not be able to determine if it is the intended recipient of the transmission.

Figure 8C:
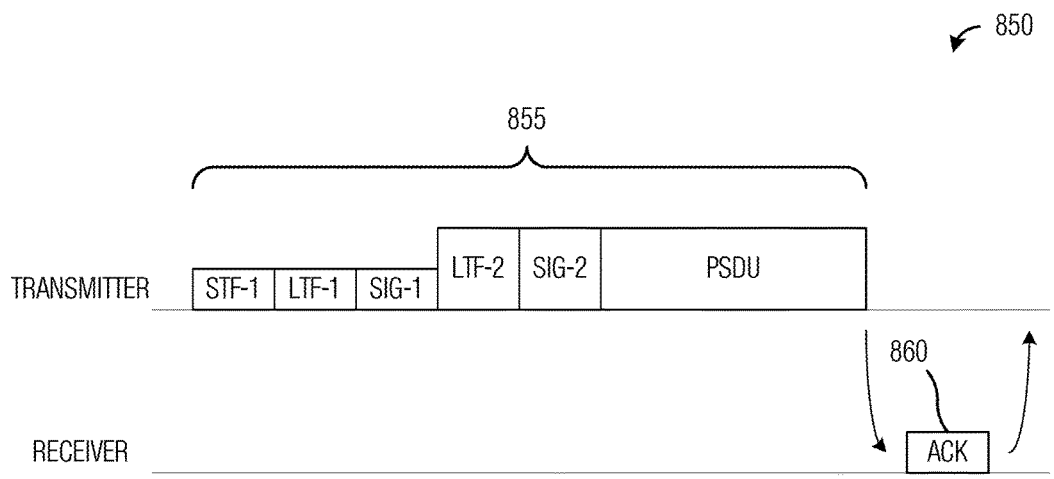
FIG. 8c illustrates an example transmission and acknowledgement sequence according to example embodiments described herein.

FIG. 8c illustrates a transmission and acknowledgement sequence 855. As shown in FIG. 8c, a transmitter transmits a transmission 855 to a receiver and the receiver transmits an acknowledgement 860 back to the transmitter. Acknowledgement 860 may be transmitted on a 1 MHz channel. Acknowledgement 860 may also be appended to or combined with another transmission. Acknowledgement 860 may also be transmitted on a 2 MHz or higher channel, possibly by appending or combining acknowledgement 860 with another transmission.

Figure 9A:
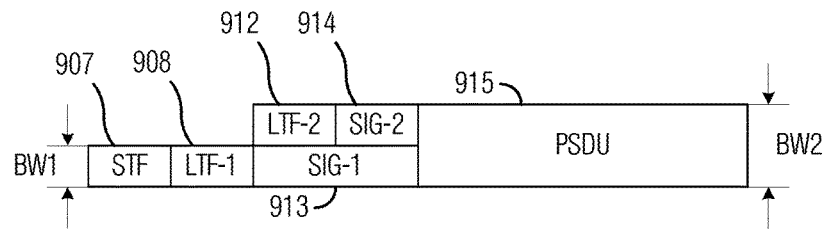
FIGS. 9a through 9c illustrate example transmissions with an overlapping preamble according to example embodiments described herein.

FIG. 9a illustrates a first transmission 900 with an overlapping preamble. First transmission 900 includes a first preamble 905, a second preamble 910, and a data portion 915. First preamble 905 may be transmitted on a 1 MHz channel and may include a STF 907 and a first LTF 908. Second preamble 910 may transmitted on a 2 MHz (or higher) channel and may include multiple fields transmitted on multiple frequency bands. As shown in FIG. 9a, second preamble 910 includes a second LTF 912, a first SIG field 913, and a second SIG field 914. First SIG field 913 may be transmitted on a first frequency band, e.g., a first 1 MHz out of the available 2 MHz, and second LTF 912 and second SIG field 914 may be transmitted on a second frequency band, e.g., a second 1 MHz out of the available 2 MHz. It is noted that FIG. 9a illustrates only one possible arrangement out of many possible arrangements and should not be construed as being limiting to either the scope or the spirit of the example embodiments.

As shown in FIG. 9a, first SIG field 913 may be use for signaling 1 MHz mode station or for far-away stations. In first SIG field 913, there may be a duration field used for NAV configuration). First LTF 908 and second LTF 912 may be the same (e.g., contain the same information) or different. In order to maintain equal or substantially equal power spectrum density for first SIG field 913 and first LTF 908 and second LTF 912, a power boost may be applied to second preamble 910.

A portion of first LTF 908 may be used to indicate the presence of second LTF 912 and second SIG field 914 (or to indicate a preamble format as shown in FIG. 8a). As an illustrative example, orthogonal LTF sequences, phase rotations of LTF sequences, and the like, may be used in first LTF 908. As another example, an indicator may be located in first SIG field 913 to indicate the presence of second LTF 912 and second SIG field 914. It is noted that first SIG field 913 may be longer than second SIG field 914. As an example, first SIG field 913 may be 4, 6, or 8 symbols long, while second SIG field 914 may be 2, 3, or 4 symbols long (therefore, second LTF 912 may also be 2, 3, or 4 symbols long). As another example, a special sequence may be use for first LTF 908 to indicate the presence of second LTF 912 and second SIG field 914. As another example, a special sequence may be use for second LTF 912 to indicate the presence of second LTF 912 and second SIG field 914. As another example, a symbol in first SIG field 913 (or second SIG field 914) is phase rotated to indicate the presence of second LTF 912 and second SIG field 914. First SIG field 913 may be encoded with a different MCS from second SIG field 914. As an example, first SIG field 913 may be encoded with BPSK with repetition 2 (or repetition 3 or repetition 4), while second SIG field 914 is BPSK. Alternatively, both first SIG field 913 and second SIG field 914 may be encoded using the same MCS. Contents of first SIG field 913 and second SIG field 914 may be different. As an example, first SIG field 913 may include a duration field, a partial AID, and/or other fields, while second SIG field 914 may include a bandwidth indicator (e.g., the indicator of the second bandwidth), along with multiple input, multiple output (MIMO) information.

Figure 9B:
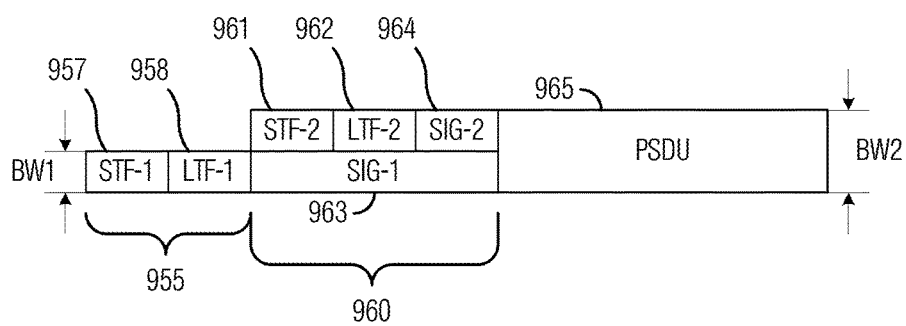

FIG. 9b illustrates a second transmission 950 with an overlapping preamble. Second transmission 950 includes a first preamble 955, a second preamble 960, and a data portion 965. First preamble 955 may be transmitted on a 1 MHz channel and may include a first STF 957 and a first LTF 958. Second preamble 960 may transmitted on a 2 MHz (or higher) channel and may include multiple fields transmitted on multiple frequency bands. As shown in FIG. 9b, second preamble 960 includes a second LTF 961 (may be 1, or 2 symbols long), a second LTF 962 (may be 1, or 2 symbols long), a first SIG field 963 (may be 4, 6, or 8 symbols long), and a second SIG field 964 (may be 2, or 4 symbols long). First SIG field 963 may be transmitted on a first frequency band, e.g., a first 1 MHz out of the available 2 MHz, and second STF 961, second LTF 962 and second SIG field 964 may be transmitted on a second frequency band, e.g., a second 1 MHz out of the available 2 MHz. A power boost may be utilized to equalize power spectrum density. It is noted that FIG. 9b illustrates only one possible arrangement out of many possible arrangements and should not be construed as being limiting to either the scope or the spirit of the example embodiments. As an example, second LTF 962 and second SIG field 964 may overlap with first LTF 958 and first SIG field 963. As another example, second STF 961, second LTF 962, and second SIG field 964 may overlap with first LTF 958 and first SIG field 963. As another example, second STF 961, second LTF 962, and second SIG field 964 may overlap with first STF 957, first LTF 958, and first SIG 963.

Typically, when a station decodes first SIG field 963, it may be able to set its NAV according to the duration field contained therein. If there is a partial AID field in first SIG field 963 (or in both first SIG field 963 and second SIG field 964), the station may be able to determine if it is or is not the intended receiver. If the station is not the intended receiver, the station may set its NAV and avoid further decoding. When the station determines that the preamble format is as shown in FIG. 9b, the station may attempt to decode second SIG field 964. If it cannot do so, the station may set its NAV. If the station can decode second SIG field 964, the station may process information contained in second SIG field 964.

Figure 9C:
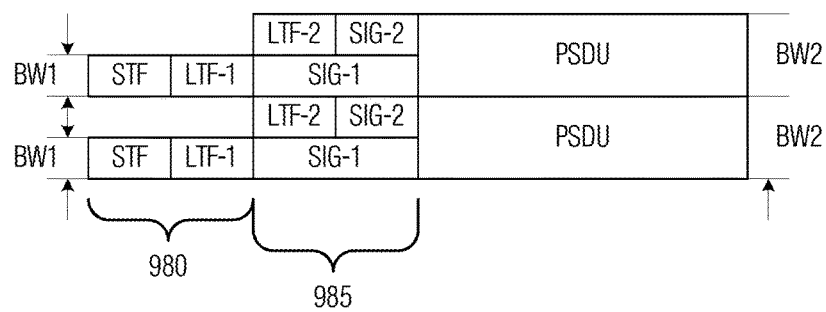

FIG. 9c illustrates a third transmission 975 with an overlapping preamble. Third transmission 975 illustrates a situation where the second channel is a 4 MHz, 8 MHz, 16 MHz, and the like, bandwidth channel. Third transmission 975 includes a first preamble 980 and a second preamble 985. The preambles (both first preamble 980 and second preamble 985) may be repeated in 2 MHz frequency ranges. According to an example embodiment, there may be a first preamble and a second preamble for every 2 MHz of bandwidth of the second channel. Hence, if the second channel is an 8 MHz channel, then there may be 4 preambles.

Figure 10:
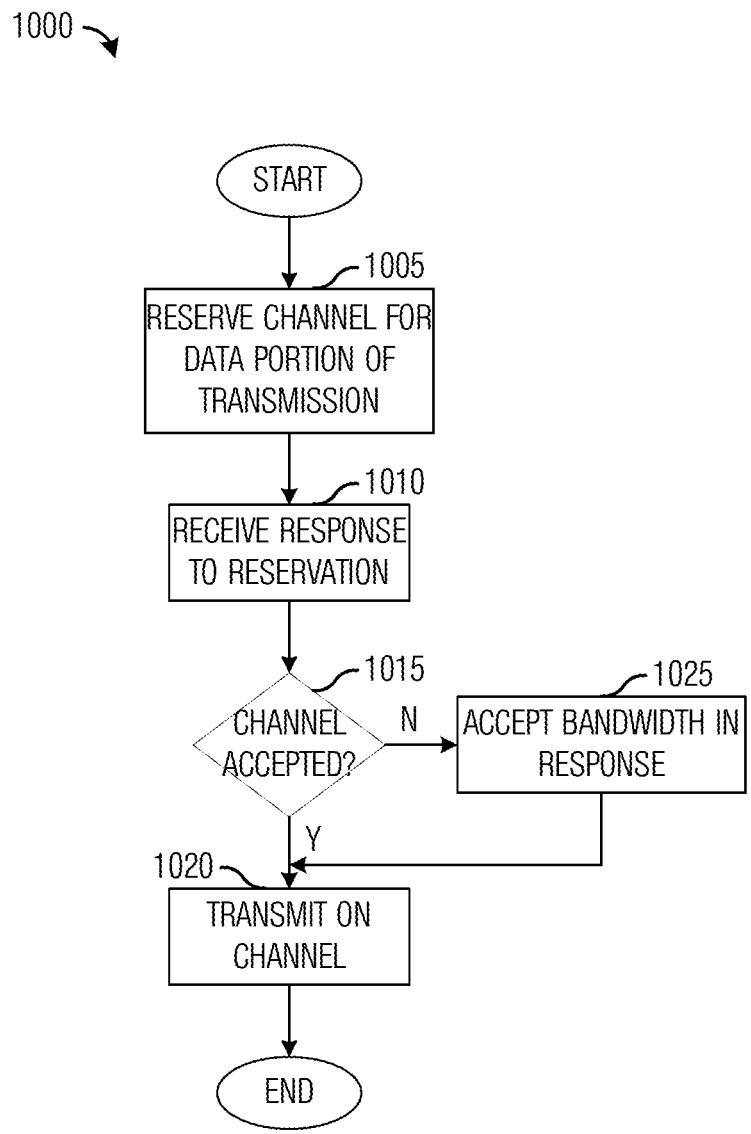
FIG. 10 illustrates an example flow diagram of operations occurring at a first device as the first device transmits to a second device according to example embodiments described herein.

FIG. 10 illustrates a flow diagram of operations 1000 occurring at a first device as the first device transmits to a second device. Operations 1000 may be indicative of operations occurring at a first device, such as an access point or a station, as the first device transmits to a second device, such as a station or an access point.

Operations 1000 may begin with the first device selects and reserves a channel with a bandwidth to be used to transmit a data portion of its transmission (block 1005). The first device may select the channel based on a number of factors, such as channel availability, first device capability, second device capability, channel condition, and the like. The first device may reserve the channel by transmitting a request message to the second device with the request message including a first indicator of the channel and/or the bandwidth. The first device may transmit an RTS message to the second device, for example. As an illustrative example, consider a scenario wherein the channels available for selection may have bandwidths of 1 MHz, 2 MHz, 4 MHz, 8 MHz, and 16 MHz. Then, to indicate one of the 5 available bandwidths, the indicator needs to be at least capable of indicating one of 5 values, which may be possible with a 3-bit long indicator.

The first device may then receive a response to the request message from the second device (block 1010). As an illustrative example, the response message may be a CTS message. The response message may include a second indicator of the channel and/or the bandwidth. According to an example embodiment, if the second device agrees to the channel with the bandwidth as reserved by the first device, the second device may include in the response message the second indicator indicating the same bandwidth as the first indicator indicated in the request message.

The first device may perform a check to determine if the channel was accepted (block 1015). As an illustrative example, the first device may check the second indicator included in the response message. If the second indicator indicates the same bandwidth as the first indicator in the request message, then the second device accepted the channel. If the second indicator indicates a different bandwidth from the bandwidth indicated by the first indicator, then the second device did not accept the channel.

If the channel was accepted, the first device may then transmit to the second device (block 1020). The transmission to the second device may include a preamble of the transmission on a 1 MHz channel, for example, and a data portion on the channel as reserved and accepted. If the channel was not accepted, the first device may accept the bandwidth indicated by the second indicator in the response message (block 1020). The first device may then transmit to the second device (block 1020). The transmission to the second device may include a preamble of the transmission on a 1 MHz channel, for example, and a data portion on the channel as accepted.

Alternatively, if the channel was not accepted by the second device, the first device may adjust the bandwidth of the channel. As an example, the first device may select a smaller bandwidth for the channel. The first device may reserve a channel with the adjusted bandwidth, by repeating block 1005, for example.

Figure 11:
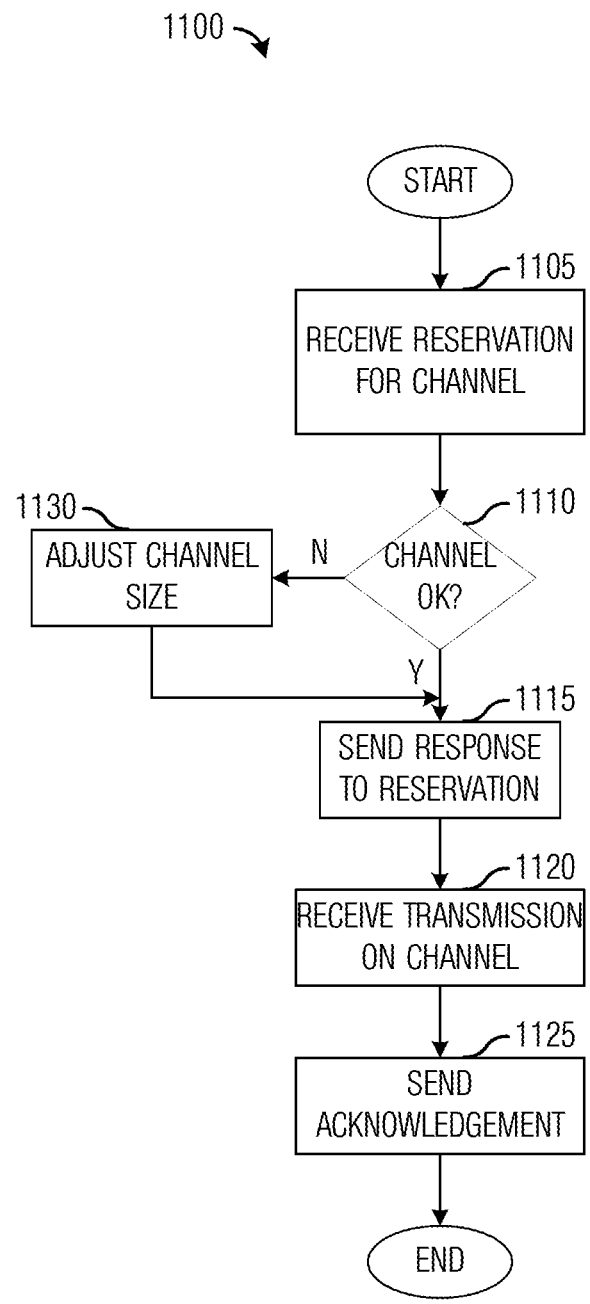
FIG. 11 illustrates an example flow diagram of operations occurring at a second device as the second device receives from a first device according to example embodiments described herein.

FIG. 11 illustrates a flow diagram of operations 1100 occurring at a second device as the second device receives from a first device. Operations 1100 may be indicative of operations occurring at a second device, such as an access point or a station, as the second device receives from a first device, such as a station or an access point.

Operations 1100 may begin with the second device receiving a request message from the first device (block 1105). As an illustrative example, the request message may be a RTS message. The request message may include a first indicator of the channel and/or the bandwidth. The second device may perform a check to determine if the channel and/or the bandwidth is acceptable (OK) for the second device (block 1110). As an illustrative example, the second device may determine if it is current capable of providing computational support, buffer space, and the like, to decode a transmission received at the bandwidth, its network condition is capable of supporting the data rate, and the like.

If the channel and/or the bandwidth is acceptable, then the second device may send a response message to the first device (block 1115). As an illustrative example, the response message may be a CTS message. The response message may include a second indicator of the channel and/or the bandwidth. According to an example embodiment, if the second device agrees to the channel with the bandwidth as reserved by the first device, the second device may include in the response message the second indicator indicating the same bandwidth as the first indicator indicated in the request message. The second device may receive a transmission from the first device (block 1120). The transmission received by the second device may include a preamble of the transmission on a 1 MHz channel, for example, and a data portion on the channel as reserved and accepted. The second device may send an acknowledgement to the first device (block 1125).

If the channel and/or the bandwidth is not acceptable, then the second device may adjust the bandwidth of the channel (block 1130). The second device may send a response message to the first device with the second indicator indicating the adjusted bandwidth of the channel (block 1115). The second device may receive a transmission from the first device (block 1120). The transmission received by the second device may include a preamble of the transmission on a 1 MHz channel, for example, and a data portion on the channel as adjusted. The second device may send an acknowledgement to the first device (block 1125).

Figure 12A:
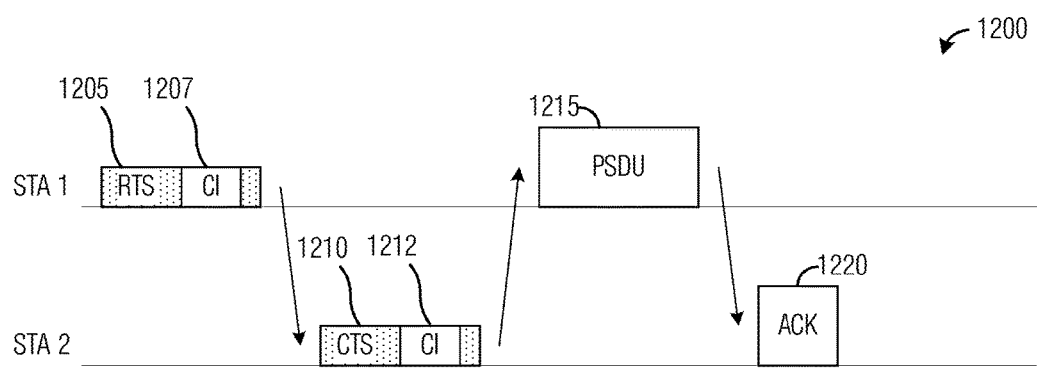
FIGS. 12a through 12d illustrate example sequence of transmissions in negotiating a bandwidth for a channel according to example embodiments described herein.

FIG. 12a illustrates a first sequence of transmissions 1200 in negotiating a bandwidth for a channel. First sequence of transmissions 1200 may include a request message 1205, e.g., a RTS, from a first station to a second station. Request message 1205 may include a channel indicator (CI) 1207, which may indicate a channel and/or a channel bandwidth for the channel as requested by the first station. First sequence of transmissions 1200 may include a response message 1210, e.g., a CTS, from the second station to the first station. Response message 1210 may include a CI 1212, which may indicate a channel and/or a channel bandwidth for the channel as accepted by the second station. First sequence of transmissions 1200 may include may include a data portion 1215 as transmitted by the first station. It is noted that a preamble is not shown. First sequence of transmissions 1200 may include may also include an acknowledgement 1220 as transmitted by the second station.

Figure 12B:
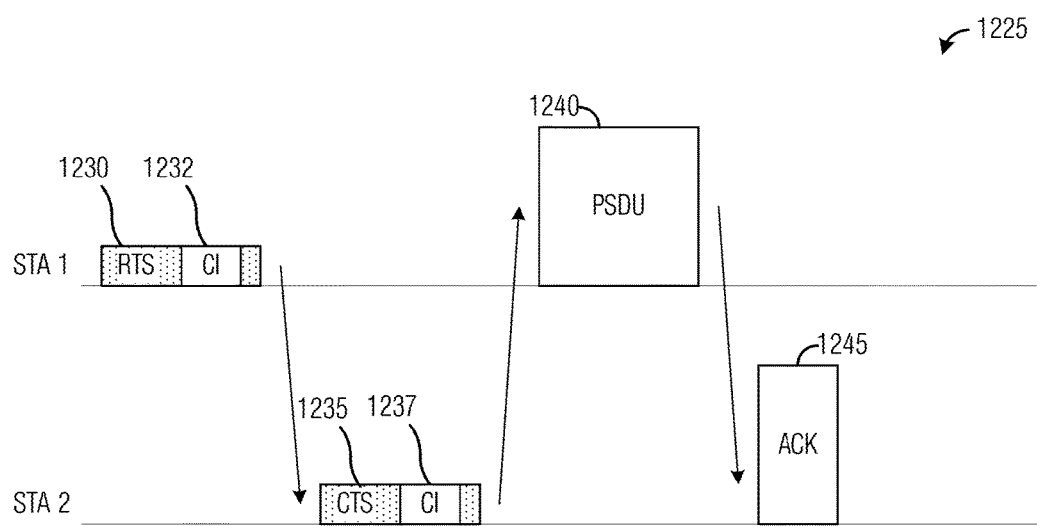

FIG. 12b illustrates a second sequence of transmissions 1225 in negotiating a bandwidth for a channel. Second sequence of transmissions 1225 may include a request message 1230, e.g., a RTS, from a first station to a second station. Request message 1230 may include a CI 1232, which may indicate a channel and/or a channel bandwidth for the channel as requested by the first station. Second sequence of transmissions 1225 may include a response message 1235, e.g., a CTS, from the second station to the first station. Response message 1235 may include a CI 1237, which may indicate a channel and/or a channel bandwidth for the channel as accepted by the second station. Second sequence of transmissions 1225 may include may include a data portion 1240 as transmitted by the first station. It is noted that a preamble is not shown. Second sequence of transmissions 1225 may include may also include an acknowledgement 1245 as transmitted by the second station. It is noted that second sequence of transmissions 1225 and first sequence of transmissions 1200 are similar except for the channel requested by the first station.

Figure 12C:
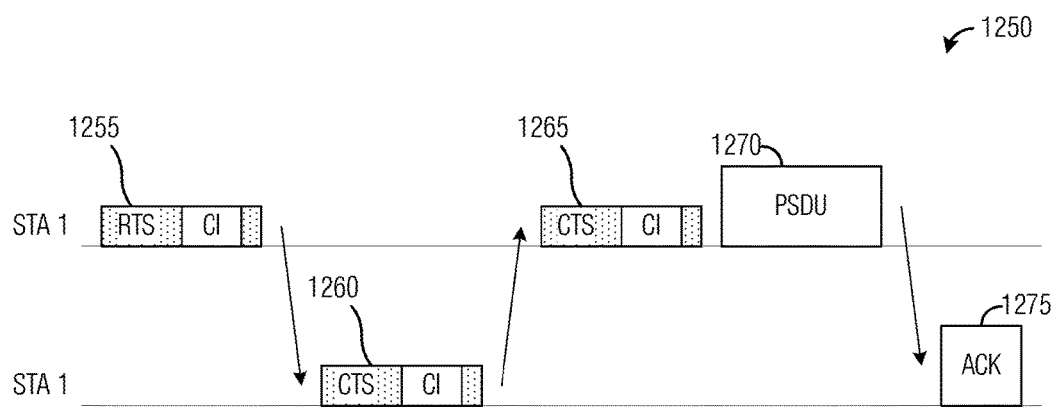

FIG. 12c illustrates a third sequence of transmissions 1250 in negotiating a bandwidth for a channel. Third sequence of transmissions 1250 may include a request message 1255, e.g., a RTS, from a first station to a second station. Request message 1255 may include a channel indicator, which may indicate a channel and/or a channel bandwidth for the channel as requested by the first station. Third sequence of transmissions 1250 may include a response message 1260, e.g., a CTS, from the second station to the first station. Response message 1260 may include a channel indicator, which may indicate a channel and/or a channel bandwidth for the channel as accepted by the second station. However, the channel indicator in response message 1260 may indicate a channel and/or a channel bandwidth that is different from the channel indicator in request message 1255. Since the channel and/or the channel bandwidth is different, the first station may reserve another channel and/or channel bandwidth using another request message. Third sequence of transmissions 1250 may include request message 1265 with a channel indicator indicating the channel and/or channel bandwidth indicated in response message 1260. Third sequence of transmissions 1250 may include may include a data portion 1270 as transmitted by the first station. It is noted that a preamble is not shown. Third sequence of transmissions 1250 may include may also include an acknowledgement 1275 as transmitted by the second station.

In general, when the channel indicator in the response message indicates a narrower channel bandwidth than the channel indicator in the request message, the first station may send an additional request message (which may be sent to self) with the channel indicator indicating the narrower channel bandwidth. When stations receive the additional request message, they may reset their NAV in accordance with the channel indicator of the additional request message. If the stations do not reset their NAV, additional bandwidth (the difference between the channel bandwidths of the channels in the request message and the additional request message) may be wasted. Furthermore, in the additional request message, there may be an additional indicator indicating there will be a third message (a request message to self) so that the stations may wait for the third message.

Figure 12D:
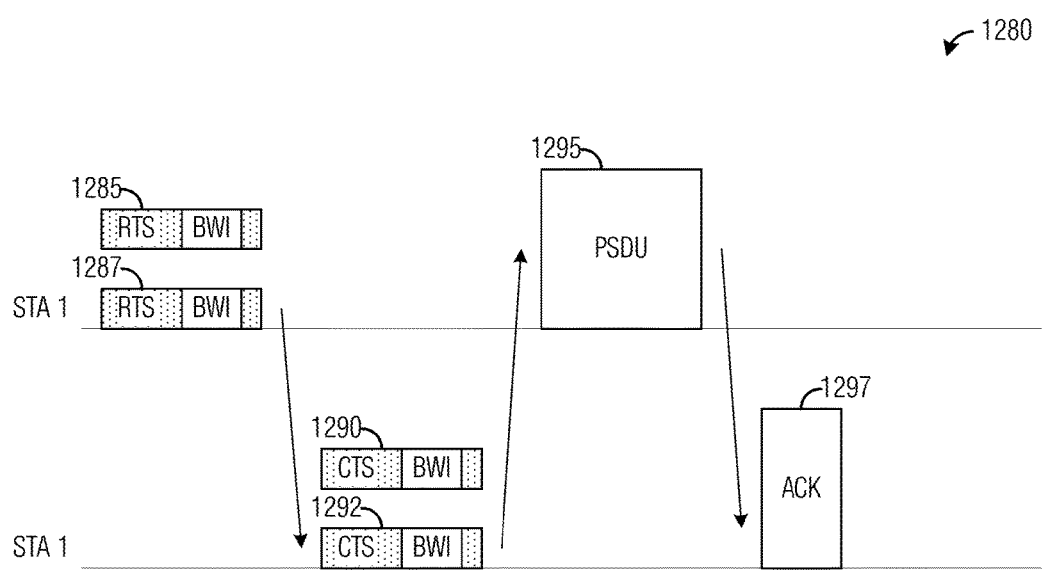

FIG. 12d illustrates a fourth sequence of transmissions 1280 in negotiating a bandwidth for a channel. As shown in FIG. 12d, the channel and/or channel bandwidth is greater than 2 MHz, i.e., 4 MHz, 8 MHz, 16 MHz, and the like, so it may be possible to transmit the request message and/or the response message in 1 MHz channels per every 2 MHz, such as shown with preambles in FIG. 7 and FIG. 9c. As an example, all request messages may have the same channel indicator and all response messages may have the same channel indicator.

Although the discussion has focused on channels located in different frequency bands and operations in a frequency division manner, the example embodiments discussed herein may be operable in a time division manner. As an example, time may be partitioned into multiple intervals with each dedicated to transmissions on channels having a particular channel bandwidth. In a first interval, transmissions occur on 1 MHz channels, while in a second interval, transmissions occur on 2 MHz channels. Similarly, an alternating approach may be utilized, where in a first interval, transmissions occur on 1 MHz channels, transmissions occur on 2 MHz channels in a second interval, transmissions occur on 1 MHz channels on a third interval, transmissions occur on 4 MHz channels in a fourth interval, transmissions occur on 1 MHz channels on a fifth interval, and the like. It is noted that durations of the individual intervals may or may not be the same.

Figure 13:
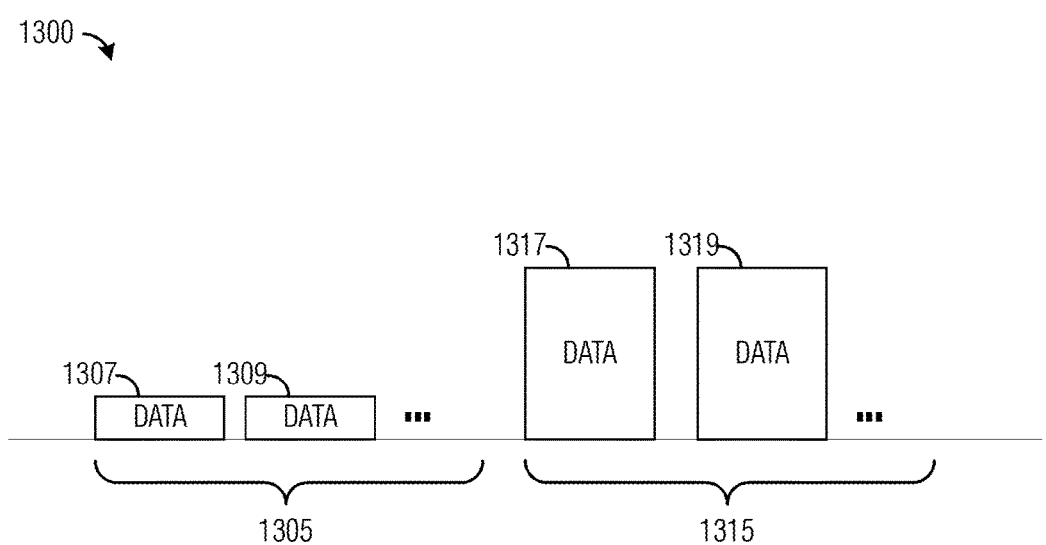
FIG. 13 illustrates an example sequence of transmissions occurring in a communications system utilizing multiple intervals according to example embodiments described herein.

FIG. 13 illustrates a sequence of transmissions 1300 occurring in a communications system utilizing multiple intervals. As shown in FIG. 13, time may be partitioned into multiple intervals, such as interval 1305 and interval 1315. In interval 1305, transmissions may occur only on channels with first channel bandwidths, such as 1 MHz channels. As an example, transmission 1307 and transmission 1309 are transmitted on 1 MHz channels. In interval 1315, transmissions may occur only on channels with second channel bandwidths, such as 2 MHz (or higher) channels. As an example, transmission 1317 and transmission 1319 are transmitted on 4 MHz channels. It is noted that the channel bandwidths of the transmissions shown in FIG. 13 are for illustrative purposes only and that other channel bandwidths may be utilized.

Figure 14:
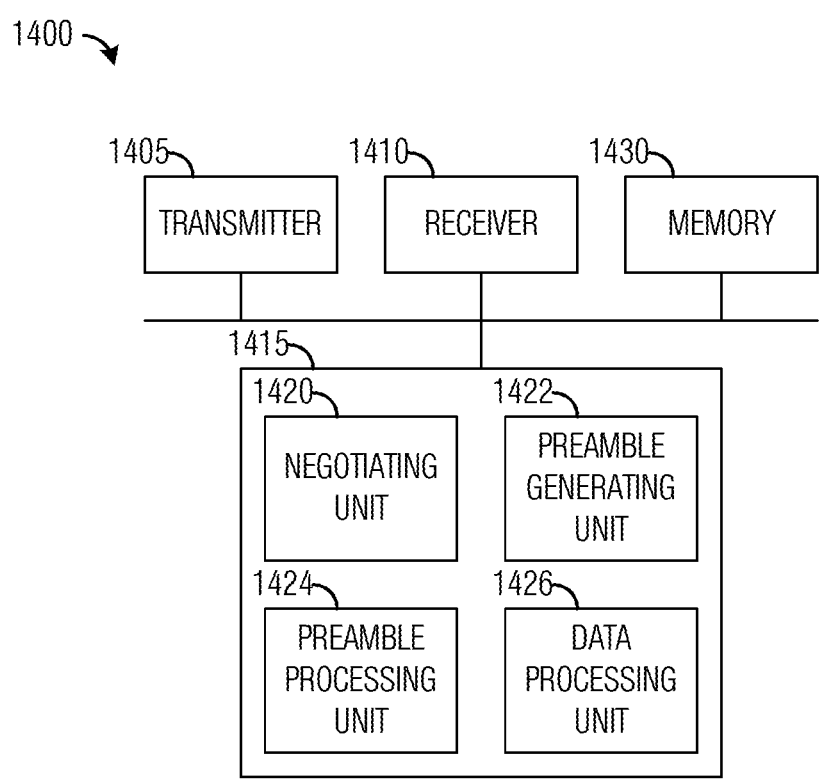
FIG. 14 illustrates an example communications device according to example embodiments described herein.

FIG. 14 provides an illustration of a communications device 1400. Communications device 1400 may be an implementation of a device, such as an access point, a station, and the like. Communications device 1400 may be used to implement various ones of the embodiments discussed herein. As shown in FIG. 14, a transmitter 1405 is configured to send packets and/or signals and a receiver 1410 is configured to receive packets and/or signals. Transmitter 1405 and receiver 1410 may have a wireless interface, a wireline interface, or a combination thereof.

A negotiating unit 1420 is configured to negotiate a channel bandwidth of a channel used to transmit a data portion of a transmission. As an example, negotiating unit 1420 makes use of RTS and CTS messages to negotiate the channel bandwidth. A preamble generating unit 1422 is configured to generate information to be transmitted in a preamble(s) of the transmission, such as STF, LTF, SIG fields, indicator(s), channel indicators, and the like. A preamble processing unit 1424 is configured to process a preamble of a received transmission to determine if communications device 1400 is an intended recipient of the transmission, channel bandwidth of a channel used to receive the data portion of the transmission, combine information from multiple preamble(s), and the like. A data processing unit 1426 is configured to process data of the transmission. A memory 1430 is configured to store channel bandwidth, preambles, indicator(s), channel indicator(s), intervals, and the like.

The elements of communications device 1400 may be implemented as specific hardware logic blocks. In an alternative, the elements of communications device 1400 may be implemented as software executing in a processor, controller, application specific integrated circuit, or so on. In yet another alternative, the elements of communications device 1400 may be implemented as a combination of software and/or hardware.

As an example, transmitter 1405 and receiver 1410 may be implemented as a specific hardware block, while negotiating unit 1420, preamble generating unit 1422, preamble processing unit 1424, and data processing unit 1426 may be software modules executing in a processor 1615, a microprocessor, a custom circuit, or a custom compiled logic array of a field programmable logic array. Negotiating unit 1420, preamble generating unit 1422, preamble processing unit 1424, and data processing unit 1426 may be stored as modules in memory 1430.

Although the present disclosure and its advantages have been described in detail, it should be understood that various changes, substitutions and alterations can be made herein without departing from the spirit and scope of the disclosure as defined by the appended claims.

What is claimed is:

1. A method for transmitting a transmission to a station in a wireless network, the method comprising:
    transmitting, by a transmitter in a first time interval, a first preamble of the transmission to the station using a first channel with a first bandwidth, the first preamble including a first indicator indicating a second channel with a second bandwidth, the second bandwidth greater than the first bandwidth;
    transmitting, by the transmitter in the first time interval, a second preamble of the transmission to the station using a third channel with a third bandwidth, the third channel separated from the first channel by at least a fourth channel, the second preamble being a duplicate of the first preamble, including the first indicator indicating the second channel with the second bandwidth, the second bandwidth greater than the third bandwidth;

transmitting, by the transmitter, a data portion of the transmission to the station using the second channel with the second bandwidth; and negotiating the second bandwidth of the second channel with the station by:

transmitting a request message including a second indicator of a proposed channel with a proposed bandwidth to the station;

receiving a response message including a third indicator of an acceptable channel with an acceptable bandwidth from the station; and setting the second bandwidth equal to the acceptable bandwidth.

2. The method of claim 1, wherein the first and third bandwidths are 1 MHz, and wherein the second bandwidth is one of 4 MHz, 8 MHz, or 16 MHz.

3. The method of claim 1, further comprising transmitting a training field and a signal field.

4. The method of claim 3, wherein the training field is transmitted on a first portion of the second bandwidth of the second channel, wherein the signal field is transmitted on a second portion of the second bandwidth of the second channel, and wherein the transmission of the training field and the signal field overlap in time.

5. The method of claim 1, wherein the request message comprises a request to send message, and wherein the response message comprises a clear to send message.

6. The method of claim 1, wherein the data portion is transmitted in a second time interval.

7. A method for receiving a transmission from a transmitter in a wireless network, the method comprising:

receiving, by a station in a first time interval, a first preamble of the transmission from the transmitter using a first channel with a first bandwidth, the first preamble including a first indicator indicating a second channel with a second bandwidth, the second bandwidth greater than the first bandwidth;

receiving, by the station in the first time interval, a second preamble of the transmission from the transmitter using a third channel with a third bandwidth, the third channel separated from the first channel by at least a fourth channel, the second preamble being a duplicate of the first preamble, including the first indicator indicating the second channel with the second bandwidth, the second bandwidth greater than the third bandwidth;

receiving, by the station, a data portion of the transmission from the transmitter using the second channel with the second bandwidth; and negotiating, by the station, the second bandwidth of the second channel with the transmitter by:

receiving a request message including a second indicator of a proposed channel with a proposed bandwidth to the station;

transmitting a response message including a third indicator of an acceptable channel with an acceptable bandwidth from the station; and setting the second bandwidth equal to the acceptable bandwidth.

8. The method of claim 7, wherein the first and third bandwidths are 1 MHz, and wherein the second bandwidth is one of 4 MHz, 8 MHz, or 16 MHz.

9. A device comprising:

a processor configured to:

negotiate a second bandwidth of a second channel with a station, including setting the second bandwidth equal to an acceptable bandwidth; and generate a first preamble and a second preamble;

a transmitter coupled to the processor and configured to:

transmit a request message including a second indicator of a proposed channel with a proposed bandwidth to the station;

transmit, in a first time interval, the first preamble of a transmission to a station using a first channel with a first bandwidth, the first preamble including a first indicator indicating the second channel with the second bandwidth, the second bandwidth greater than the first bandwidth, transmit, in the first time interval, the second preamble of the transmission to the station using a third channel with a third bandwidth, the third channel separated from the first channel by at least a fourth channel, the second preamble being a duplicate of the first preamble, including the first indicator indicating the second channel with the second bandwidth, the second bandwidth greater than the third bandwidth, and transmit a data portion of the transmission to the station using the second channel with the second bandwidth; and a receiver operatively coupled to the processor and configured to receive a response message including a third indicator of an acceptable channel with the acceptable bandwidth from the station.

10. The device of claim 9, wherein the transmitter is configured to transmit a training field on a first portion of the second bandwidth of the second channel, wherein the transmitter is configured to transmit a signal field on a second portion of the second bandwidth of the second channel, and wherein the transmission of the training field and the signal field overlap in time.

11. A station comprising:

a receiver configured to:

receive a request message including a second indicator of a proposed channel with a proposed bandwidth from a wireless device, receive, in a first time interval, a first preamble of a transmission from the wireless device using a first channel with a first bandwidth, the first preamble including a first indicator indicating a second channel with a second bandwidth, the second bandwidth greater than the first bandwidth, receive, in the first time interval, a second preamble of the transmission from the wireless device using a third channel with a third bandwidth, the third channel separated from the first channel by at least a fourth channel, the second preamble being a duplicate of the first preamble, including the first indicator indicating the second channel with the second bandwidth, the second bandwidth greater than the third bandwidth, and receive a data portion of the transmission from the wireless device using the second channel with the second bandwidth;

a transmitter configured to transmit a response message including a third indicator of an acceptable channel with an acceptable bandwidth to the wireless device; and a processor operatively coupled to the receiver and the transmitter, and configured to:

negotiate the second bandwidth of the second channel with the wireless device, including setting the second bandwidth equal to the acceptable bandwidth, and decode the first preamble and the second preamble.

12. The station of claim 11, wherein the receiver is configured to receive a training field using the second channel.

13. The station of claim 11, wherein the receiver is configured to receive a training field and a signal field on the second channel.

14. The station of claim 11, wherein the receiver is configured to receive a training field on a first portion of the second bandwidth of the second channel, wherein the receiver is configured to receive a signal field on a second portion of the second bandwidth of the second channel, and wherein training field and the signal field overlap in time.

15. The method of claim 1, wherein the first preamble and the second preamble are identical except for being transmitted on different frequency ranges.

16. The method of claim 1, wherein the second channel comprises the first channel and the third channel.

17. The method of claim 16, wherein the second channel further comprises the fourth channel between the first channel and the third channel.

18. The method of claim 17, wherein the second preamble is transmitted using the third channel and the fourth channel.

19. The method of claim 1, wherein a third preamble is transmitted using only the third channel.

20. The method of claim 7, wherein the second channel comprises the first channel and the third channel.

21. The method of claim 20, wherein the second channel further comprises a fourth channel between the first channel and the third channel.

22. The method of claim 21, wherein the second preamble is received using the third channel and the fourth channel.

23. The method of claim 7, wherein a third preamble is received using only the third channel.

* * * * *